US009306650B2

(12) United States Patent
Nagata et al.

(10) Patent No.: US 9,306,650 B2
(45) Date of Patent: Apr. 5, 2016

(54) RADIO COMMUNICATION SYSTEM, USER TERMINAL, RADIO BASE STATION APPARATUS AND RADIO COMMUNICATION METHOD

(71) Applicant: NTT DOCOMO, INC., Tokyo (JP)

(72) Inventors: Satoshi Nagata, Tokyo (JP); Xiang Yun, Beijing (CN); Xiaoming She, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 78 days.

(21) Appl. No.: 14/375,573

(22) PCT Filed: Jan. 24, 2013

(86) PCT No.: PCT/JP2013/051480
§ 371 (c)(1),
(2) Date: Jul. 30, 2014

(87) PCT Pub. No.: WO2013/115065
PCT Pub. Date: Aug. 8, 2013

(65) Prior Publication Data
US 2015/0018034 A1     Jan. 15, 2015

(30) Foreign Application Priority Data

Feb. 2, 2012 (JP) ................................. 2012-021078

(51) Int. Cl.
*H04B 7/00* (2006.01)
*H04B 7/06* (2006.01)
(Continued)

(52) U.S. Cl.
CPC ............ *H04B 7/0626* (2013.01); *H04L 5/0035* (2013.01); *H04L 5/0057* (2013.01); *H04L 5/0073* (2013.01); *H04W 24/08* (2013.01); *H04B 7/024* (2013.01)

(58) Field of Classification Search
CPC .... H04B 7/024; H04B 7/0626; H04B 7/0417; H04B 7/0632; H04B 7/0619; H04B 17/24; H04B 17/309; H04L 5/0035; H04L 5/0048; H04L 1/0026; H04L 5/0073; H04W 72/04
USPC .......... 455/524, 525, 509, 508, 515, 434, 507, 455/500, 517, 445, 67.11, 436.1–444, 403, 455/422.1, 426.1, 426.2, 550.1; 370/252, 370/310, 328, 329, 331, 338, 343
See application file for complete search history.

(56) References Cited

U.S. PATENT DOCUMENTS 8,249,044 B2    8/2012  Onodera et al.
2011/0183669 A1* 7/2011 Kazmi .............. H04W 36/0083
                                                 455/434

(Continued)

FOREIGN PATENT DOCUMENTS

WO    2007/102506 A1    9/2007
WO    2011/158943 A1   12/2011

OTHER PUBLICATIONS

International Search Report for corresponding International Application No. PCT/JP2013/051480, mailed Apr. 9, 2013 (1 page).

(Continued)

Primary Examiner — Keith Ferguson
(74) Attorney, Agent, or Firm — Osha Liang LLP

(57) ABSTRACT

The present invention is designed to prevent the decrease of throughput and also reduce the overhead of CSI feedback when CoMP transmission is applied. In a radio communication system including a plurality of radio base station apparatuses and a user terminal that is configured to be able to carry out coordinated multiple-point transmission/reception with the plurality of radio base station apparatuses, the radio base station apparatus designates a plurality of candidate values of predetermined inter-cell channel state information and reports them to the user terminal, and the user terminal measures inter-cell channel state information of each cell, and also selects a specific candidate value that is close to the measurement value of inter-cell channel state information from the plurality of candidate values that have been reported, and feeds back the specific candidate value to the radio base station apparatus.

11 Claims, 12 Drawing Sheets

(51) Int. Cl.
*H04W 24/08* (2009.01)
*H04L 5/00* (2006.01)
*H04B 7/02* (2006.01)

(56) References Cited

U.S. PATENT DOCUMENTS

2012/0076038 A1* 3/2012 Shan ................ H04B 7/026
　　　　　　　　　　　　　　　　　　　　　　370/252

2013/0114751 A1   5/2013 Nagata et al.

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

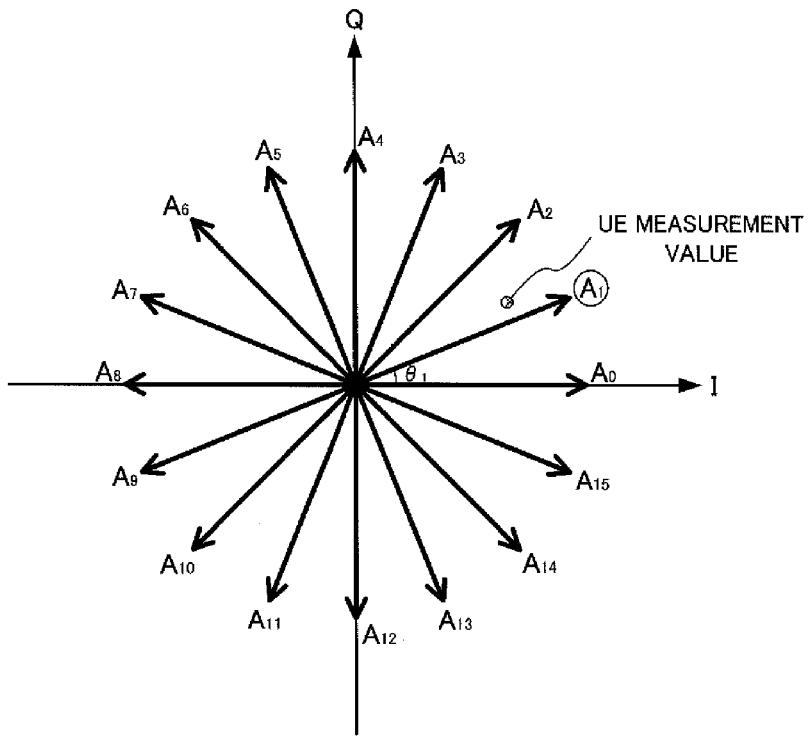
FIG.3A
CANDIDATE INTER-CELL CSI VALUE
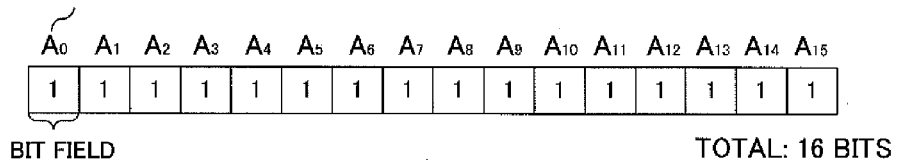
BIT FIELD                                                    TOTAL: 16 BITS
FIG.3B
| CANDIDATE VALUE | $A_0$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ |
|---|---|---|---|---|---|---|---|---|---|---|---|---|---|---|---|---|
| PHASE DIFFERENCE | $\theta_0$ | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ | $\theta_{12}$ | $\theta_{13}$ | $\theta_{14}$ | $\theta_{15}$ |
FIG.3C

| $A_0$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 |

BIT FIELD

TOTAL: 16 BITS

| $A_0$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ |
|---|---|---|---|---|---|---|---|---|---|---|---|---|---|---|---|
| 1 | 0 | 0 | 0 | 1 | 0 | 0 | 0 | 1 | 0 | 0 | 0 | 1 | 0 | 0 | 0 |

BIT FIELD            TOTAL: 16 BITS

| A0 | A1 | A2 | A3 | A4 | A5 | A6 | A7 | A8 | A9 | A10 | A11 | A12 | A13 | A14 | A15 |
|----|----|----|----|----|----|----|----|----|----|-----|-----|-----|-----|-----|-----|
| 1 | 1 | 1 | 1 | 0 | 0 | 0 | 0 | 0 | 0 | 0 | 0 | 0 | 0 | 0 | 0 |

BIT FIELD    TOTAL: 16 BITS

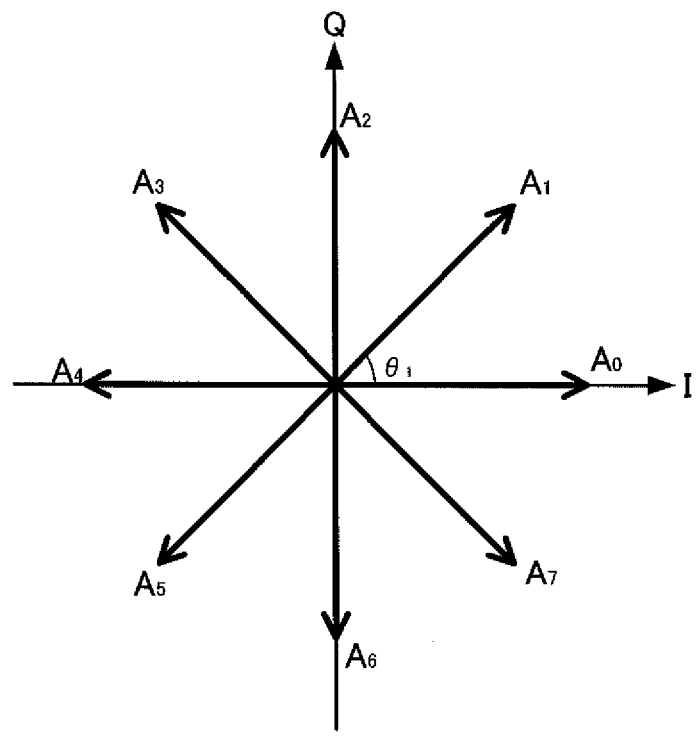
FIG.7A
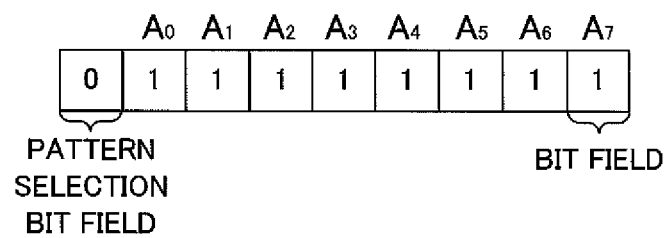
PATTERN SELECTION BIT FIELD
BIT FIELD
FIG.7B
| CANDIDATE VALUE | $A_0$ | $A_1$ | $A_2$ | $A_3$ | $A_4$ | $A_5$ | $A_6$ | $A_7$ |
|---|---|---|---|---|---|---|---|---|
| PHASE DIFFERENCE | $\theta_0$ | $\theta_1$ | $\theta_2$ | $\theta_3$ | $\theta_4$ | $\theta_5$ | $\theta_6$ | $\theta_7$ |
FIG.7C

RADIO COMMUNICATION SYSTEM, USER TERMINAL, RADIO BASE STATION APPARATUS AND RADIO COMMUNICATION METHOD

TECHNICAL FIELD

The present invention relates to a radio communication system, a user terminal, a radio base station apparatus and a radio communication method that are applicable to a cellular system and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. In relationship to this UMTS network, long-term evolution (LTE) is under study for the purposes of further increasing high-speed data rates, providing low delay and so on (non-patent literature 1).

In a third-generation system, generally, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, successor systems of LTE are under study as well (for example, LTE-Advanced (LTE-A)), for the purpose of achieving further broadbandization and higher speed.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonalization is provided between user terminal UEs (User Equipments) in the frequency domain. On the other hand, between cells, like in W-CDMA, interference randomization by one-cell frequency re-use is fundamental.

In the 3GPP (3rd Generation Partnership Project), coordinated multiple-point transmission/reception (CoMP) technique is under study as a technique for realizing inter-cell orthogonalization. In this CoMP transmission/reception, a plurality of cells coordinate and perform signal processing for transmission and reception for one user terminal UE or for a plurality of user terminal UEs. For example, for the downlink, simultaneous transmission of a plurality of cells and coordinated scheduling/beam forming, which adopt precoding, are under study. By adopting these CoMP transmission/reception techniques, improvement of throughput performance is expected, especially with respect to user terminal UEs located on cell edges.

To apply CoMP transmission/reception techniques, it is necessary to feed back channel state information (CSI) for a plurality of cells, from a user terminal to a radio base station apparatus. Consequently, the overhead of CSI feedback increases. If the overhead of CSI feedback is simply made smaller, CoMP transmission/reception techniques cannot be applied effectively, and therefore throughput is not improved either.

The present invention has been made in view of the above, and it is therefore an object of the present invention to provide a radio communication system, a user terminal, a radio base station apparatus and a radio communication method, which, when CoMP transmission is applied, can prevent the decrease of throughput and which can also reduce the amount of information in CSI feedback.

Solution to Problem

The radio communication system according to the present invention is a radio communication system including a plurality of radio base station apparatuses and a user terminal that is configured to be able to perform coordinated multiple-point transmission/reception with the plurality of radio base station apparatuses, and, in this radio communication system, the radio base station apparatus has a determining section configured to designate a plurality of candidate values for predetermined inter-cell channel state information, and a reporting section configured to report the plurality of candidate values to the user terminal, and the user terminal has a measurement section configured to measure inter-cell channel state information per cell, a detection section configured to select a specific candidate value that is close to a measurement value of inter-cell channel state information from the plurality of candidate values reported, and a transmission section configured to feed back information to represent the specific candidate value.

The user terminal according to the present invention is a user terminal that is configured to be able to carry out coordinated multiple-point transmission/reception with a plurality of radio base station apparatuses, and this user terminal has a receiving section configured to receive a plurality of candidate values for inter-cell channel state information which the radio base station apparatus designates, a measurement section configured to measure inter-cell channel state information per cell, a detection section configured to select a specific candidate value that is close to a measurement value of inter-cell channel state information from the plurality of candidate values, and a transmission section configured to feed back information to represent the specific candidate value.

The radio base station apparatus according to the present invention is a radio base station apparatus that is configured to be able to carry out coordinated multiple-point transmission/reception with a user terminal, and this radio base station apparatus has: a determining section configured to designate a plurality of candidate values for predetermined inter-cell channel state information which the user terminal is allowed to select; and a reporting section configured to report the plurality of candidate values to the user terminal, and the determining section designates a bit to represent a predetermined candidate value to report to the user terminal, from among bit fields that respectively correspond to candidate values that can be selected.

The radio communication method according to the present invention is a radio communication method for a plurality of radio base station apparatuses and a user terminal that is configured to be able to perform coordinated multiple-point transmission/reception with the plurality of radio base station apparatuses, and this radio communication method includes the steps of, at the radio base station apparatus, designating a plurality of candidate values for predetermined inter-cell channel state information, and reporting the plurality of candidate values to the user terminal, and, at the user terminal, measuring inter-cell channel state information per cell, selecting a specific candidate value that is close to a measurement value of inter-cell channel state information from the plurality of candidate values reported from the radio base station apparatus, and, feeding back information to represent the specific candidate value.

Advantageous Effects of Invention

According to the present invention, when CoMP transmission is applied, it is possible to prevent the decrease of throughput and also reduce the amount of information in CSI feedback.

BRIEF DESCRIPTION OF DRAWINGS

FIG. 3 provides diagrams to show an example of an I-Q plane where selectable candidate inter-cell CSI values are provided, and bit fields that correspond to candidate inter-cell CSI values;

FIG. 7 provides diagrams to show another example of an I-Q plane where selectable candidate inter-cell CSI values are provided and bit fields that correspond to candidate inter-cell CSI values;

DESCRIPTION OF EMBODIMENTS

Now, an embodiment of the present invention will be described below in detail with reference to the accompanying drawings.

Figure 1A:
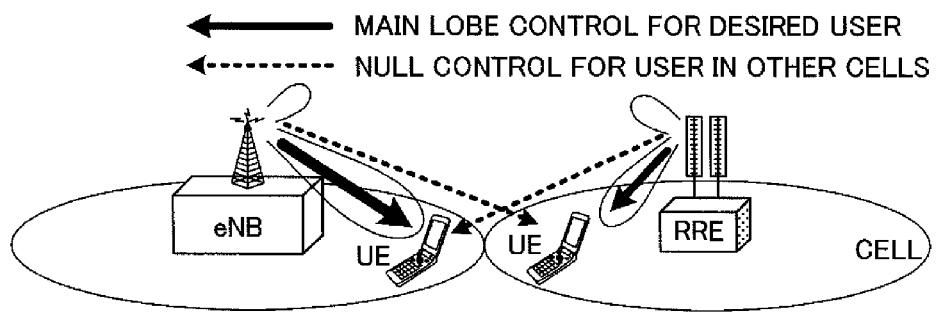
FIG. 1 provides diagrams to explain coordinated multiple-point transmission.
Figure 1B:
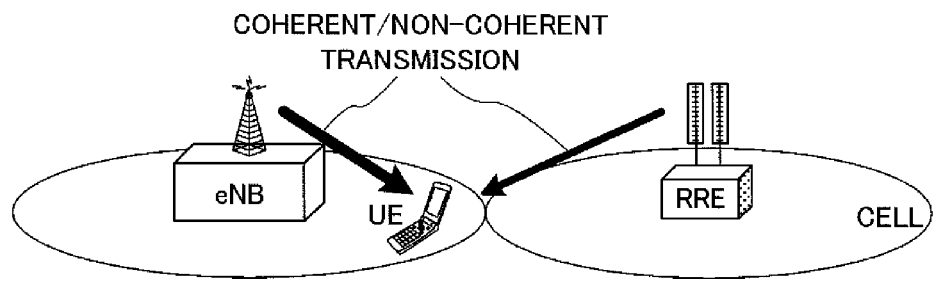
Figure 1C:
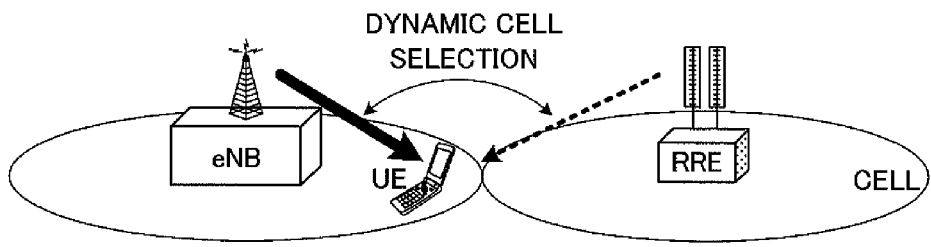

First, downlink CoMP transmission will be described using FIG. 1. Downlink CoMP transmission includes coordinated scheduling/coordinated beamforming, and joint processing. Coordinated scheduling/coordinated beamforming refers to the method of transmitting a shared data channel to one user terminal UE from only one cell, and, as shown in FIG. 1A, allocates radio resources in the frequency/space domain, taking into account interference from other cells and interference against other cells. Meanwhile, joint processing refers to the method of transmitting a shared data channel from a plurality of cells, at the same time, by applying precoding, and includes joint transmission to transmit a shared data channel from a plurality of cells to one user terminal UE, as shown in FIG. 1B, and dynamic point selection (DPS) to select one cell instantaneously and transmit a shared data channel, as shown in FIG. 1C.

Figure 2A:
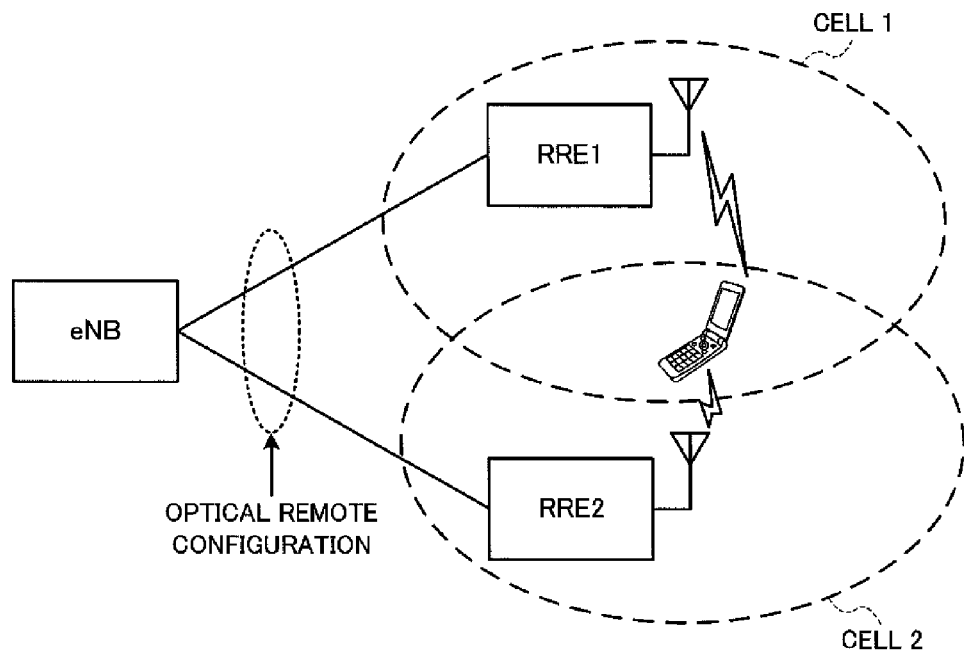
FIG. 2 provides schematic diagrams to show configurations of radio base station apparatuses that are adopted in coordinated multiple-point transmission/reception.
Figure 2B:
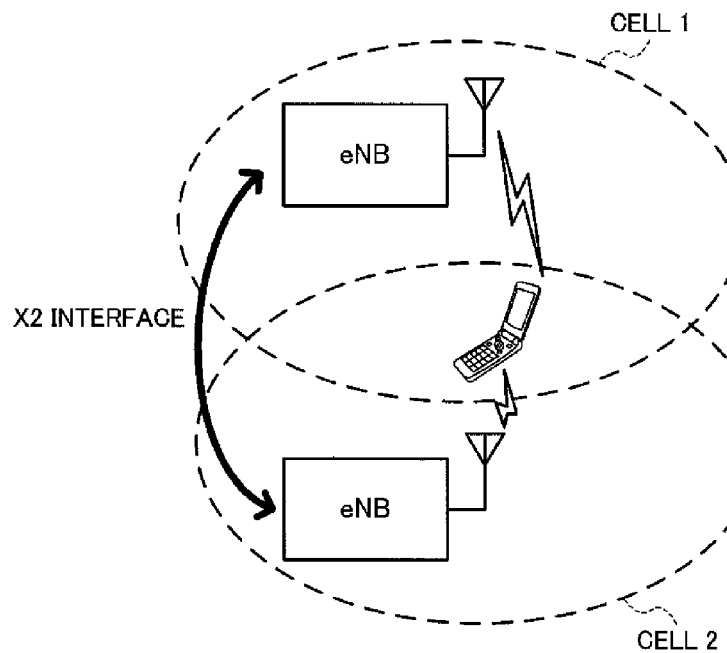

As for the configuration to implement CoMP transmission/reception, there are, for example, a configuration (centralized control based on an RRE configuration) to include a plurality of remote radio equipment (RREs) that are connected with a radio base station apparatus (radio base station apparatus eNB) by optical fiber and so on as shown in FIG. 2A, and a configuration (autonomous distributed control based on an independent base station configuration) of a radio base station apparatus (radio base station apparatus eNB) as shown in FIG. 2B. Note that although FIG. 2A shows a configuration to include a plurality of remote radio equipment RREs, it is equally possible to use a configuration to include only single remote radio equipment RRE, as shown in FIG. 1.

In the configuration shown in FIG. 2A (RRE configuration), remote radio equipment RRE 1 and RRE 2 are controlled in a centralized fashion in a radio base station apparatus eNB. In the RRE configuration, the radio base station apparatus eNB (central base station) that performs baseband signal processing and control for a plurality of remote radio equipment RREs, and each cell (that is, each remote radio equipment RRE) are connected by baseband signals using optical fiber, so that it is possible to execute radio resource control between cells in the central base station altogether. That is, the problems of signaling delay and overhead between radio base station apparatus eNBs, which become problems in an independent base station configuration, are insignificant, and high-speed radio resource control between cells is relatively easy. Consequently, in the RRE configuration, it is possible to apply a method to use fast signal processing between cells such as simultaneous transmission of a plurality of cells, to the downlink.

On the other hand, in the configuration shown in FIG. 2B (independent base station configuration), a plurality of radio base station apparatus eNBs (or RREs) each perform radio resource allocation control such as scheduling. In this case, timing information and radio resource allocation information such as scheduling are transmitted to one radio base station apparatus eNB, if necessary, using the X2 interface between the radio base station apparatus eNB of cell 1 and the radio base station apparatus eNB of cell 2, for coordination between the cells.

CoMP transmission is applied to improve the throughput of user terminals located on cell edges. Consequently, when a user terminal is located on a cell edge, control is executed to apply CoMP transmission. In this case, the radio base station apparatus finds the difference between the quality information (for example, RSRP (Reference Signal Received Power)) of each cell from the user terminal, and, when the difference is equal to or less than a threshold value—that is, when there is little difference in terms of quality between cells—decides that the user terminal is located on a cell edge, and applies CoMP transmission. On the other hand, when the difference between the quality information of each cell exceeds the threshold value—that is, when the difference between cells in terms of quality is significant—it is decided that the user terminal is located near the radio base station apparatus of one cell and located near the center of that cell, and therefore CoMP transmission is not applied.

When CoMP transmission is applied, the user terminal feeds back channel state information for each of a plurality of cells to the radio base station apparatus (the radio base station apparatus of the serving cell). On the other hand, when CoMP transmission is not applied, the user terminal feeds back the channel state information of the serving cell to the radio base station apparatus. In this way, when CoMP transmission is applied, channel state information is fed back for each of a plurality of cells, so that the overhead of feedback information increases.

The channel state information here includes channel state information of each cell, and channel state information between cells. For example, in joint transmission-type CoMP, the same data is transmitted with the same phase, at the same time, from the radio base station apparatuses of a plurality of cells to a user terminal. In this case, it is necessary to feed back information between cells with the channel state information of each cell, so that the user terminal is able to receive the same data with the same phase, at the same time.

The channel state information per cell may include PMI (Precoding Matrix Indicator), CDI (Channel Distribution Information), CQI (Channel Quality Indicator) and so on. Also, the channel state information between cells (hereinafter also referred to as "inter-cell CSI") includes, for example, phase difference information, amplitude difference information and so on.

Of the above channel state information, the present inventors have focused on the channel state information between cells (inter-cell CSI). As described above, when CoMP is applied, although it is preferable to feed back inter-cell CSI with high accuracy so as to allow a user terminal to receive the same data with the same phase and at the same time, in this case, the amount of information (the number of bits) to feed back increases.

Meanwhile, depending on the communication environment of a user terminal (conditions of communication), there may be periods in which the inter-cell CSI measurement values measured in the user terminal vary little. For example, when a user terminal does not move, the phase differences and amplitude differences between cells become small compared to the case where the user terminal moves, and therefore the inter-cell CSI measurement values in the user terminal spread within a predetermined range. However, even in this case, the user terminal has to repeat feeding back similar or the same inter-cell CSI measurement values to the radio base station apparatus with a large number of bits.

So, the present inventors have found out that the amount of information (the number of bits) to feed back CSI can be reduced by allowing a radio base station apparatus to designate and report candidate values for channel state information between cells (candidate inter-cell CSI values) to a user terminal, and by allowing the user terminal to feed back specific candidate inter-cell CSI values that are close to an inter-cell CSI measurement value. In particular, the present inventors have found out that, by allowing a radio base station apparatus to dynamically change the number of candidate inter-cell CSI values to designate and the range of designation on the basis of feedback information and so on, it is possible to maintain the accuracy of inter-cell CSI to feed back from a user terminal and also reduce the amount of CSI feedback information.

Furthermore, the present inventors have also focused on the relationship between quality information differences per cell and the accuracy of inter-cell CSI. As described above, when there is little difference between the quality information of each cell, it is decided that a user terminal is located on a cell edge, and therefore CoMP is applied, whereas, when the difference between the quality information of each cell is significant, it is decided that the user terminal is located near the center of a cell, and therefore CoMP is not applied.

Consequently, for example, when joint transmission-type CoMP is applied, if the difference between the quality information per cell is insignificant, it may be assumed that inter-cell CSI of higher accuracy (granularity) is necessary. On the other hand, when the difference between the quality information per cell is significant, it may be assumed that the accuracy (granularity) of inter-cell CSI needs not be so high. Here, the granularity of inter-cell channel state information means how fine (accurate) the inter-cell channel state information is, and higher granularity means higher accuracy.

Consequently, if granularity is replaced with the amount of information of inter-cell CSI, the higher the granularity of inter-cell CSI, the greater the amount of information (the number of bits) in inter-cell CSI, and the lower the granularity of inter-cell CSI, the smaller the amount of information (the number of bits) in inter-cell CSI. That is, in other words, the accuracy of inter-cell CSI to be required varies depending on the communication environment. So, the present inventors have found out that it is possible to reduce the amount of CSI information to feed back by changing the accuracy of inter-cell CSI depending on differences between the quality information of each cell. Now, the present embodiment will be described below in detail with reference to the accompanying drawings.

With the present embodiment, a radio base station apparatus designates a plurality of candidate values of inter-cell channel state information (candidate inter-cell CSI values) and reports these to a user terminal. The user terminal selects and feeds back specific candidate inter-cell CSI values that are close to an inter-cell CSI measurement value measured by the user terminal, from the plurality of candidate values designated by the radio base station apparatus. Note that a candidate inter-cell CSI value refers to an inter-cell CSI configuration value which the radio base station apparatus sets to allow the user terminal to select.

In this case, the user terminal feeds back information (identification information) that represents specific candidate inter-cell CSI values. That is, the user terminal feeds back information that represents the specific candidate inter-cell CSI values which the user terminal has selected, instead of feeding back inter-cell CSI itself.

In this case, the amount of information (the number of bits) which the user terminal feeds back as inter-cell CSI relies upon the number of candidate inter-cell CSI values (M) which the radio base station apparatus designates. For example, when the radio base station apparatus sets four candidate inter-cell CSI values (M=4), the number of bits the user terminal feeds back as inter-cell CSI is two bits ($=\log_2 M$). Similarly, when the number of candidate inter-cell CSI values which the radio base station apparatus designates is M=5 to 8, M=9 to 16 and M=17 to 32, the amount of information the user terminal feeds back becomes three bits, four bits, and five bits, respectively.

So, the radio base station apparatus is able to control the amount of information (the number of bits) to be fed back from the user terminal, by dynamically changing the number of candidate inter-cell CSI values to designate. Also, by dynamically changing the range of designation of candidate inter-cell CSI values (the intervals between a plurality of candidate inter-cell CSI values) which the radio base station apparatus designates, it is possible to control the accuracy of inter-cell CSI to be fed back from the user terminal. For example, when the radio base station apparatus designates a plurality of candidate inter-cell CSI values in a localized manner in a predetermined range, it is possible to maintain the accuracy of inter-cell CSI to be fed back and also reduce the amount of feedback information.

Also, the radio base station apparatus is able to report information about the designated candidate inter-cell CSI values to the user terminal through higher layer signaling. To be more specific, bit fields that respectively correspond to candidate inter-cell CSI values that are available for selection are provided, and, from these bit fields, the radio base station apparatus designates the bits that represent predetermined candidate values, and reports bit information to the user terminal through higher layer signaling.

Now, a specific example in which a radio base station apparatus designates candidate inter-cell CSI values will be described below. FIG. 3 to FIG. 6 each show cases where a radio base station apparatus selects different numbers of candidate inter-cell CSI values (select different designation patterns) from the candidate inter-cell CSI values that can be selected (in FIG. 3 to FIG. 6, 16 values from $A_0$ to $A_{15}$).

FIG. 3 shows an example of a case where a radio base station apparatus selects a plurality of candidate inter-cell CSI values. Note that FIG. 3A shows, on an I-Q plane, the candidate values ($A_0$ to $A_{15}$) of inter-cell channel state information which the radio base station apparatus designates, FIG. 3B shows bit fields that respectively correspond to the candidate values ($A_0$ to $A_{15}$) that can be selected, and FIG. 3C shows a table in which phase difference information to correspond to each candidate value ($A_0$ to $A_{15}$) is defined. Note that, in the following description, phase difference information between cells, represented in angles on an I-Q plane, will be described as an example of inter-cell CSI. Obviously, amplitude difference information, which is represented as the distance from the origin on an I-Q plane, is equally applicable to the present embodiment.

To be more specific, FIG. 3 shows a case where a radio base station apparatus designates all of the maximum number of candidate inter-cell CSI values ($A_0$ to $A_{15}$) that are selectable, and reports them to a user terminal. When the radio base station apparatus designates predetermined candidate inter-cell CSI values, the radio base station apparatus designates the bits to represent the predetermined candidate inter-cell CSI values from the bit fields respectively corresponding to the selectable candidate inter-cell CSI values ($A_0$ to $A_{15}$) (the bit fields are "1").

For example, FIG. 3B shows a case where the bits to represent all the selectable candidate inter-cell CSI values (sixteen, from $A_0$ to $A_{15}$) are designated. Also, the bit information (total 16 bits) shown in FIG. 3B is reported to a user terminal through higher layer signaling (for example, RRC signaling).

The user terminal selects specific inter-cell CSI that is close to the inter-cell CSI measurement value measured by the user terminal, from a plurality of candidate inter-cell CSI values (here, $A_0$ to $A_{15}$) reported from the radio base station apparatus. For example, as shown in FIG. 3A, when the measurement value of the phase difference between cells measured by the user terminal is the closest to a specific candidate inter-cell CSI value ($A_1$), the user terminal selects that specific candidate inter-cell CSI value ($A_1$).

Following this, the user terminal feeds back information (identification information) that represents the specific candidate inter-cell CSI value ($A_1$) to the radio base station apparatuses of cells carrying out coordinated multiple-point transmission. In this case, the specific candidate inter-cell CSI value ($A_1$) can be represented using four-bit information, so that the amount of feedback information to use for the phase difference information becomes four bits.

As shown in FIG. 3, when bits to represent all the candidate inter-cell CSI values ($A_0$ to $A_{15}$) that the radio base station apparatus can designate are designated and reported to a user terminal, it is possible to improve the accuracy of inter-cell CSI to feed back from the user terminal (reduce the error between the measurement value measured by the user terminal and the candidate inter-cell CSI value to be fed back).

Note that information about the candidate inter-cell CSI values (here, 16 values) which the radio base station apparatus can select is shared with the user terminal. For example, a configuration to share a table, in which the candidate inter-cell CSI values ($A_0$ to $A_{15}$) the radio base station apparatus can select and values to correspond to these candidate inter-cell CSI values are defined, between the radio base station apparatus and the user terminal, may be possible (see FIG. 3C). The user terminal may be provided with this table in advance, or a configuration may be possible in which the contents of the table are reported from the radio base station apparatus to the user terminal upon use.

FIG. 4 shows a case where a radio base station apparatus designates eight candidate inter-cell CSI values ($A_0$, $A_2$, $A_4$, $A_6$, $A_8$, $A_{10}$, $A_{12}$ and $A_{14}$) from the candidate inter-cell CSI values that are selectable (16 values from $A_0$ to $A_{15}$), and reports them to a user terminal. Also, FIG. 4 shows a case where, similar to FIG. 3 above, the designation range of candidate inter-cell CSI values which the radio base station apparatus designates (the intervals between a plurality of candidate inter-cell CSI values) becomes equal.

Figures 4A, 4B:
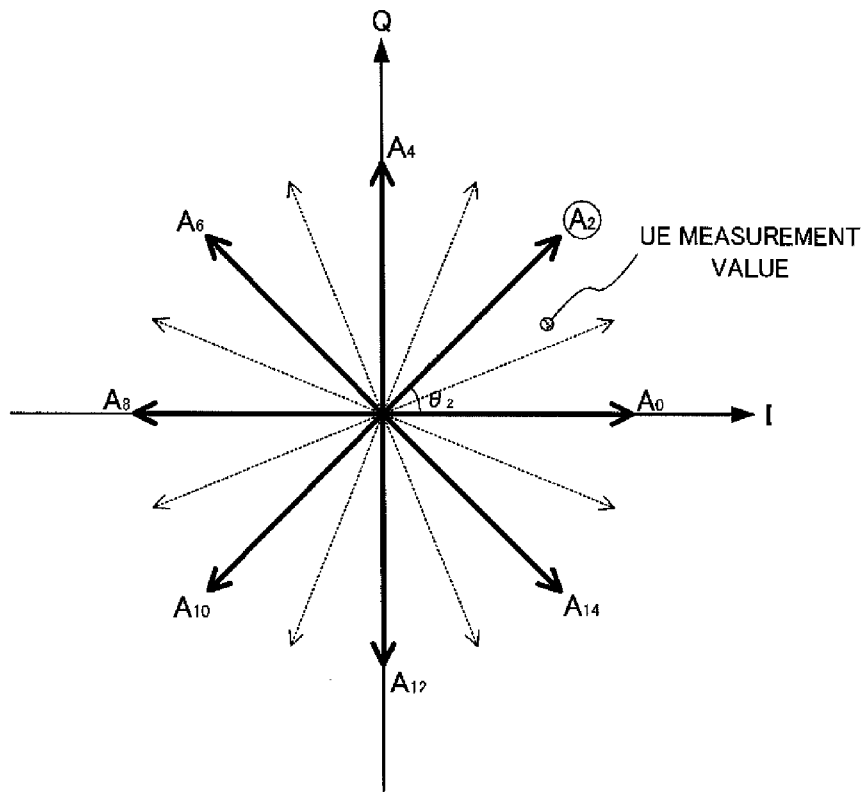
FIG. 4 provides diagrams to show another example of an I-Q plane where selectable candidate inter-cell CSI values are provided and bit fields that correspond to candidate inter-cell CSI values.
Figures 5A, 5B:
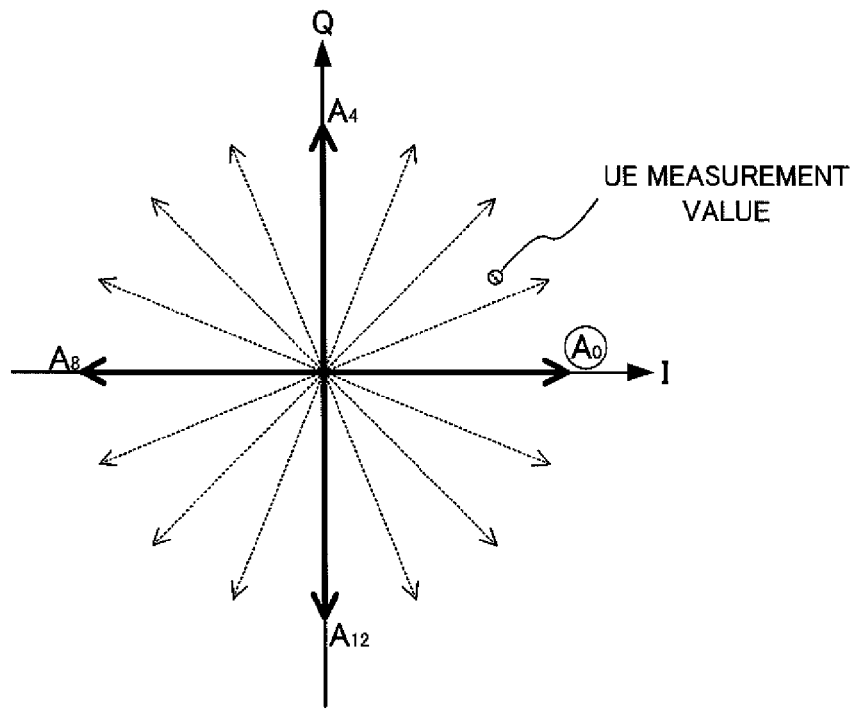
FIG. 5 provides diagrams to show another example of an I-Q plane where selectable candidate inter-cell CSI values are provided and bit fields that correspond to candidate inter-cell CSI values.

In the case shown in FIG. 4, the radio base station apparatus makes the bit fields corresponding to eight candidate inter-cell CSI values ($A_0$, $A_2$, $A_4$, $A_6$, $A_8$, $A_{10}$, $A_{12}$ and $A_{14}$) be "1," and makes the bit fields corresponding to the other candidate inter-cell CSI values ($A_1$, $A_3$, $A_5$, $A_7$, $A_9$, $A_{11}$, $A_{13}$ and $A_{15}$) be "0" (bit masking). Then, the bit information (total 16 bits) shown in FIG. 4B is reported to the user terminal through higher layer signaling.

From the eight candidate inter-cell CSI values ($A_0$, $A_2$, $A_4$, $A_6$, $A_8$, $A_{10}$, $A_{12}$, and $A_{14}$) reported from the radio base station apparatus, the user terminal selects and feeds back a specific candidate value that is close to the inter-cell CSI measurement value measured by the user terminal. For example, as shown in FIG. 4A, when the measurement value of the phase difference between cells measured by the user terminal is the closest to a specific candidate value ($A_2$), the user terminal selects and feeds back that specific candidate inter-cell CSI value ($A_2$).

In this case, the number of candidate inter-cell CSI values which the radio base station apparatus designates (M) is eight, so that the amount of information to feed back from the user terminal is three bits.

FIG. 5 shows a case where a radio base station apparatus designates four candidate inter-cell CSI values ($A_0$, $A_4$, $A_8$ and $A_{12}$) from the candidate inter-cell CSI values (16 values from $A_0$ to $A_{15}$) that can be selected, and reports them to a user terminal. In this case, it is possible to reduce the amount of information which the user terminal feeds back as phase difference information to two bits. Also, similar to FIGS. 3 and 4 above, FIG. 5 also shows a case where the designation range of candidate inter-cell CSI values which the radio base station apparatus designates is equal.

In FIG. 5, the number of candidate inter-cell CSI values which the radio base station apparatus designates (M) is four, so that it is possible to reduce the amount of information which the user terminal feeds back to two bits. In this way, as shown in FIG. 5, by designating four candidate inter-cell CSI values from all of the candidate inter-cell CSI values that are selectable such that the range of designation becomes equal, it is possible to more effectively reduce the amount of information (the number of bits) which the user terminal feeds back.

In FIG. 4 and FIG. 5, the radio base station apparatus designates predetermined candidate inter-cell CSI values from all of the candidate inter-cell CSI values that are selectable, such that the range of designation of a plurality of candidate inter-cell CSI values becomes equal. Consequently, cases might occur where, compared to the case shown in FIG. 3, it is possible to reduce the amount of information (the number of bits) which a user terminal feeds back, and where, nevertheless, the accuracy of inter-cell channel state information which the user terminal feeds back becomes lower. Consequently, the cases shown in FIG. 4 and FIG. 5 are suitable for use when inter-cell CSI does not require a high level of accuracy. Also, these are suitable for use when the inter-cell CSI measurement value measured in the user terminal varies and yet the amount of feedback information from the user terminal needs to be reduced.

In particular, as shown in FIG. 5, when four values are selected such that the intervals between the candidate inter-cell CSI values become equal, it is possible to have a rough idea of the phase difference between cells from a small amount of feedback information. For example, when $A_2$, $A_6$, $A_{10}$, $A_{14}$ are designated as candidate inter-cell CSI values, it is possible to know in which one of the first to fourth quadrants on the I-Q plane the inter-cell CSI measurement value is present, from a small amount of feedback information.

Figures 6A, 6B:
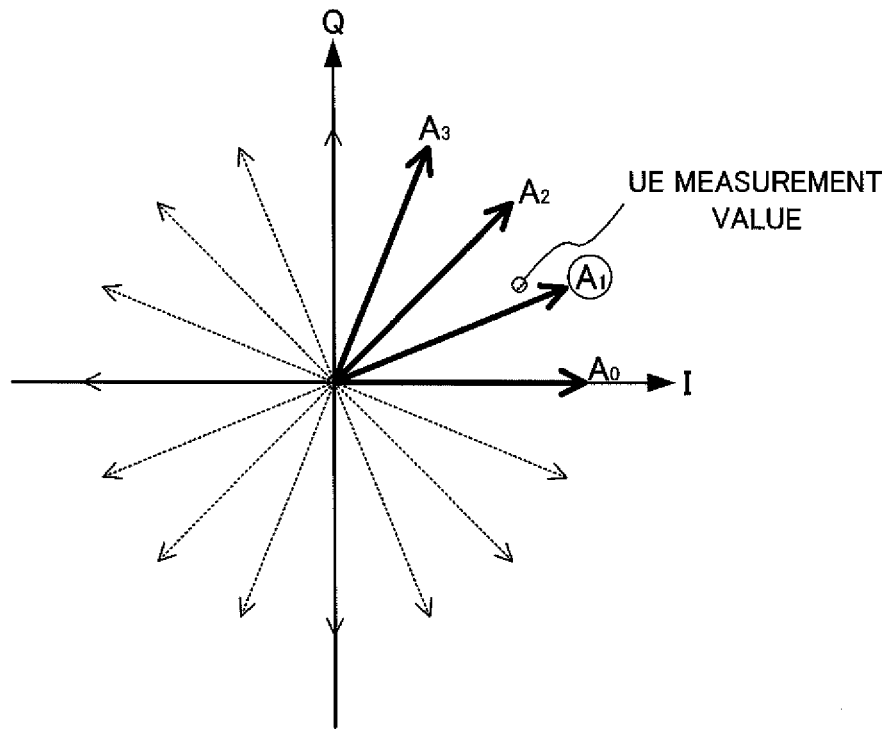
FIG. 6 provides diagrams to show another example of an I-Q plane where selectable candidate inter-cell CSI values are provided and bit fields that correspond to candidate inter-cell CSI values.

FIG. 6 shows a case where a radio base station apparatus designates four candidate inter-cell CSI values ($A_0$, $A_1$, $A_2$ and $A_3$) from the candidate inter-cell CSI values that are selectable (16 values from $A_0$ to $A_{15}$), and reports them to a user terminal. Note that, although the number of candidate inter-cell CSI values to select is the same as in FIG. 5, FIG. 6 shows a case where the designation range of candidate inter-cell CSI values which the radio base station apparatus designates is localized—that is, a case where a plurality of candidate values to correspond to a predetermined range are designated in a localized manner.

In the case shown in FIG. 6, the number of candidate inter-cell CSI values which the radio base station apparatus designates (M) is four, so that it is possible to reduce the amount of information which the user terminal feeds back to two bits. Also, since candidate inter-cell CSI values to correspond to a predetermined range are designated in a localized manner, when the inter-cell CSI measurement values vary little, it is possible to maintain the accuracy of inter-cell CSI to feed back high, and also reduce the amount of feedback information.

Note that although cases are shown in above FIGS. 3 to 6 where phase difference information between cells is applied as inter-cell CSI, amplitude difference information between cells is equally applicable. Also, it is equally possible to set candidate inter-cell CSI values combining phase difference information and amplitude difference information between cells. Also, although, in FIG. 3 to FIG. 6, 16 values (16 bits) are set as candidate inter-cell CSI values which the radio base station apparatus can designate, the number of candidate inter-cell CSI values to designate is by no means limited to this. Note that, considering the relationship with the number of bits to feed back from a user terminal, it is preferable to make the number of candidate inter-cell CSI values to designate $2^N$ (where N is an integer).

As described above, the radio base station apparatus is able to dynamically change the number and the designation range of candidate inter-cell CSI values to designate, based on, for example, specific candidate inter-cell CSI values and channel quality information fed back from a user terminal (by using FIG. 3 to FIG. 6 above on a switched basis). By this means, it is possible to adequately control the accuracy and the amount of information of CSI to be fed back from the user terminal.

Now, specific examples of the operation method to be used when a radio base station apparatus dynamically changes and designates the number and the designation range of candidate inter-cell CSI values will be described.

(Operation Method 1)

A case will be described with an operation method 1 where a radio base station apparatus makes a user terminal feed back inter-cell CSI with high accuracy, and then reduces the number of candidate values to designate anew and localizes the range of designation.

First, the radio base station apparatus sets a large number of candidate inter-cell CSI values for a user terminal to select. For example, when the radio base station apparatus is able to select maximum sixteen candidate inter-cell CSI values, the radio base station apparatus designates bits to represent all of the candidate inter-cell CSI values that are selectable ($A_0$ to $A_{15}$) (see FIGS. 3A and 3B). Also, the radio base station apparatus reports the designated bit information to the user terminal through higher layer signaling.

The user terminal selects a specific candidate inter-cell CSI value (for example, $A_1$ in FIG. 3) that is close to the measurement value of inter-cell CSI, and feeds back identification information to represent that specific candidate inter-cell CSI value. At this time, the user terminal uses four bits to feed back the candidate inter-cell CSI value $A_1$.

In this way, by designating and reporting all the candidate inter-cell CSI values that are selectable to the user terminal, it is possible to improve the accuracy of inter-cell CSI that is fed back from the user terminal.

Following this, the radio base station apparatus determines the candidate inter-cell CSI values to report to the user terminal anew, based on the specific candidate inter-cell CSI value ($A_1$) fed back from the user terminal. To be more specific, the radio base station apparatus designates a plurality of candidate inter-cell CSI values to correspond to a predetermined range where the specific candidate inter-cell CSI value ($A_1$) is included. For example, as shown in FIG. 6, four candidate inter-cell CSI values ($A_0$, $A_1$, $A_2$ and $A_3$) including $A_1$ are designated in a localized manner and reported to the user terminal.

In this case, the user terminal is able to feed back inter-cell CSI with an amount of information of two bits. Also, when the communication environment varies little, the measurement value that is measured in the user terminal stays within the range of candidate inter-cell CSI values $A_0$ to $A_3$, so that the accuracy of inter-cell channel state information can be maintained as well.

Also, when the measurement value of inter-cell CSI varies little, it is possible to designate two candidate inter-cell CSI values (for example, $A_1$ and $A_2$) in the end. In this case, it is possible to reduce the information to feed back from the user terminal to one bit.

Note that, when determining the candidate values to select anew based on a specific candidate inter-cell CSI value fed back from the user terminal, the radio base station apparatus preferably determines the range to designate locally, by taking into account the distribution of a plurality of inter-cell CSI fed back in a predetermined period. By this means, it is possible to reflect the variation of measurement values in the user terminal more accurately.

Also, as shown in FIG. 6, when candidate inter-cell CSI values are designated in a predetermined range in a localized manner, cases might occur where the inter-cell CSI measurement value digresses far from the predetermined range, due to changes in the communication environment. In this case, a large gap may be created between a specific candidate inter-cell CSI value which the user terminal selects and the inter-cell CSI measurement value, and therefore there is a threat of lowered communication quality.

For example, when candidate inter-cell CSI values are designated as shown in FIG. 6, there is a possibility that the inter-cell CSI measurement value in the user terminal becomes a value that is close to an undesignated candidate value $A_{11}$, due to changes in the communication environment. In this case, the user terminal ends up selecting and feeding back $A_0$, which is the closest to the inter-cell CSI measurement value among the candidate inter-cell CSI values designated, as a specific candidate inter-cell CSI value.

Consequently, to minimize problems like this, the radio base station preferably changes the number and designation range of candidate inter-cell CSI values to designate dynamically, based on quality information such as CQI and so on. For example, when the CQI lowers significantly, the radio base station apparatus determines that the designated candidate inter-cell CSI values are not adequate, and re-sets the designation range of inter-cell CSI to be equal, again, as shown in FIG. 3 and so on. Alternatively, when making the designation range of candidate inter-cell CSI values local, it is preferable to set the designation range of inter-cell CSI to be equal per predetermined period, as shown in FIG. 3 and so on, and check the variation of inter-cell CSI that is fed back from the user terminal again.

By applying the operation method 1 in this way, it is possible to prevent the decrease of communication quality and also reduce the amount of information to feed back from a user terminal.

(Operation Method 2)

A case will be described with an operation method 2 where a radio base station apparatus allows a user terminal to feed back inter-cell CST with a certain level of accuracy, and then localizes the designation range of candidate values to designate anew.

First, the radio base station apparatus selects predetermined candidate inter-cell CSI values from the candidate inter-cell CSI values that are available for selection such that the range of designation becomes equal. For example, when the radio base station apparatus is able to select maximum sixteen candidate inter-cell CSI values, the radio base station apparatus designates four candidate inter-cell CSI values ($A_0$, $A_4$, $A_8$, and $A_{12}$) (see FIGS. 5A and 5B). Also, the radio base station apparatus reports the designated bit information to the user terminal through higher layer signaling.

The user terminal selects a specific candidate inter-cell CSI value (for example, $A_0$ in FIG. 5A) that is close to the measurement value of inter-cell CSI, and feeds back identification information to represent that specific candidate inter-cell CSI value. At this time, the user terminal uses two bits to feed back the candidate inter-cell CSI value $A_0$.

In this way, by designating four candidate inter-cell CSI values ($A_0$, $A_4$, $A_8$ and $A_{12}$) such that the range of designation of candidate inter-cell CSI values becomes equal, it is possible to have a rough idea of phase differences between cells from a small amount of feedback information. In the case shown in FIG. 5, the candidate inter-cell CSI values are present in the range of $\pm\pi/2$ with respect to the candidate value $A_0$.

Following this, based on the specific candidate inter-cell CSI value ($A_0$) fed back from the user terminal, the radio base station apparatus designates candidate inter-cell CSI values (for example, $A_{15}$, $A_0$, $A_1$ and $A_2$) corresponding to a predetermined range where at least $A_0$ is included, in a localized manner.

In this case, the user terminal is able to feed back inter-cell CSI with higher accuracy, while maintaining an amount of information of two bits. When the communication environment varies little, the measurement value that is measured in the user terminal stays within the range of candidate inter-cell CSI values $A_{15}$ to $A_2$, so that the accuracy of inter-cell channel state information can be maintained as well.

Also, when the inter-cell CSI measurement value varies little, it is possible to designate two candidate inter-cell CSI values in the end (for example, $A_1$ and $A_2$). In this case, it is possible to reduce the information to feed back from the user terminal to one bit.

By applying the operation method 2 in this way, it is possible to maintain the state in which the amount of information to feed back from the user terminal is small, and also prevent the decrease of communication quality.

Note that, similar to the operation method 1, with the operation method 2, too, it is possible to designate the range of candidate inter-cell CSI values to select anew, taking into account the distribution of specific candidate inter-cell CSI values fed back from the user terminal. Also, the radio base station is able to change the number and the designation range of candidate inter-cell CSI values to designate, dynamically, based on quality information such as CQI, per predetermined time period, and so on.

As shown with the above operation methods 1 and 2, by controlling the number and designation range of candidate inter-cell CSI values which a radio base station apparatus designates, based on feedback information from a user terminal, it is possible to maintain the accuracy of inter-cell CSI to be fed back from the user terminal apparatus, and also reduce the amount of feedback information.

(Operation Method 3)

A case will be described with an operation method 3 where the number of candidate inter-cell CSI values which a radio base station apparatus designates (the accuracy of inter-cell CSI fed back from a user terminal) is controlled in accordance with the quality difference between the quality information of each cell (candidate coordinated cell) that carries out coordinated multiple-point transmission.

When there is little quality difference between the quality information of each cell (candidate coordinated cell) carrying out coordinated multiple-point transmission, the radio base station apparatus designates more candidate inter-cell CSI values, so that the accuracy of inter-cell CSI to feed back when CoMP is applied is improved (see, for example, FIG. 3). On the other hand, when the quality difference between the quality information of each cell carrying out coordinated multiple-point transmission is significant, the radio base station apparatus reduces the number of candidate inter-cell CSI values to designate, so that the accuracy of inter-cell channel state information to feed back when CoMP is applied becomes lower (see, for example, FIG. 4 and FIG. 5).

Quality information per cell may be, for example, RSRP, RSRQ (Reference Signal Received Quality), long-term channel quality information over time, or short-term channel quality information over time.

In this way, by controlling the number of candidate inter-cell CSI values which the radio base station apparatus designates in accordance with the quality difference between the quality information of each cell carrying out coordinated multiple-point transmission, it is possible to effectively reduce the amount of feedback information of the user terminal when inter-cell CSI is not required to be accurate.

Note that the operation method 3 may be applied in combination with the above operation method 1 or the operation method 2 as appropriate. By this means, it is possible to reduce the amount of information to be fed back from the user terminal more effectively in accordance with the communication environment.

(Operation Method 4)

A case will be described with an operation method 4 where the number of candidate inter-cell CSI values which a radio base station apparatus designates is controlled based on factors that determine the amount of CSI feedback, such as the physical uplink channel to be applied to CSI feedback in uplink transmission, and so on.

Generally, in uplink transmission, a PUSCH, which is an uplink shared channel, and a PUCCH, which is an uplink control channel, are used. The PUSCH is primarily used to transmit data signals including uplink user terminal data and so on. The PUCCH is primarily used to transmit uplink control signals including CSI, ACK/NACK, and so on. Also, radio resources at both end parts of the frequency band used on the uplink are allocated to the PUCCH. Consequently, more radio resources are allocated to the PUSCH than the radio resources allocated to the PUCCH.

Now, in uplink transmission, in subframes in which data signals are transmitted in the PUSCH, control signals are also assumed to be transmitted using the PUSCH. Cases might occur then where the amount of information to be tolerated in control signals such as CSI to be fed back from a user terminal varies, depending on the physical channel to be applied to uplink control signal transmission.

Consequently, the radio base station apparatus preferably changes the number of candidate inter-cell CSI values to designate dynamically, based on the type of the physical channel to feed back CSI. For example, when uplink control information is transmitted through the PUSCH, it is possible to apply a configuration to designate more candidate inter-cell CSI values than the case of transmitting through the PUCCH. Note that the operation method 4 may be applied in combination with above operation method 1 to the operation method 3 as appropriate.

As described above, with the present embodiment, the radio base station apparatus dynamically changes the candidate inter-cell CSI values to allow a user terminal to select, based on various conditions (specific candidate inter-cell CSI values fed back from the user terminal, quality information such as CQI, quality differences between the quality information of each cell, the type of the physical channel to be applied to uplink transmission, and so on). The radio base station apparatus is able to control the number and the designation range of candidate inter-cell CSI values to designate, taking into account one of these conditions or combinations of several of these conditions, and is by no means limited to the configurations described above.

Modified Example

Note that although cases (of one type) have been described with the above description where the maximum number of candidate inter-cell CSI values which a radio base station apparatus can designate is sixteen (16 bits), this is by no means limiting. For example, as shown in FIG. 7, the maximum number of candidate inter-cell CSI values that can be designated may be made eight (8 bits). In FIGS. 7A and 7B, a case is shown where all the candidate inter-cell CSI values which the radio base station apparatus can select are designated. In this case, information of an amount of eight bits is reported to a user terminal. Note that FIG. 7C shows a table in which phase difference information corresponding to each candidate value ($A_0$ to $A_7$) is defined.

Also, a configuration to provide a plurality of patterns, between which the maximum number of candidate inter-cell CSI values which the radio base station apparatus can select varies (for example, FIG. 3 and FIG. 7), and use different patterns on a switched basis in accordance with the conditions of communication, may be used.

For example, when the radio base station apparatus sets the number of candidate inter-cell CSI values low on a continuing basis (for example, a case of designating eight candidate inter-cell CSI values as shown in FIG. 4 and then designating four candidate inter-cell CSI values as shown in FIG. 5 on a continuing basis), it is preferable to select a pattern in which the maximum number of candidate inter-cell CSI values that are selectable is small (FIG. 7). This is because the amount of information to report from the radio base station apparatus to the user terminal can be reduced when the maximum number of candidate inter-cell CSI values that can be selected is small.

Note that, when applying a plurality of patterns between which the maximum number of inter-cell candidate CSI values that can be selected varies, the radio base station apparatus needs to report identification information that represents which pattern is applied, to a user terminal. For example, as shown in FIG. 7A, it is possible to provide a bit field (pattern selection bit field) that identifies the pattern, in a bit field that precedes the bit fields corresponding to the candidate inter-cell CSI values respectively.

The radio base station apparatus is able to define bit information to represent the pattern to select, and report this to the user terminal. The user terminal identifies the setting pattern of candidate inter-cell CSI values to be applied based on the information of the pattern selection bit field, and selects a specific candidate inter-cell CSI value that is close to the measurement value from the candidate inter-cell CSI values designated in the following bit fields.

In this way, by applying patterns between which the maximum number of candidate inter-cell CSI values that can be selected varies on a switched basis in accordance with the number of candidate inter-cell CSI values which the radio base station apparatus designates, it is possible to reduce the amount of information that relates to the candidate inter-cell CSI values and that is reported to a user terminal.

(Configuration of Radio Communication System)

Figure 8:
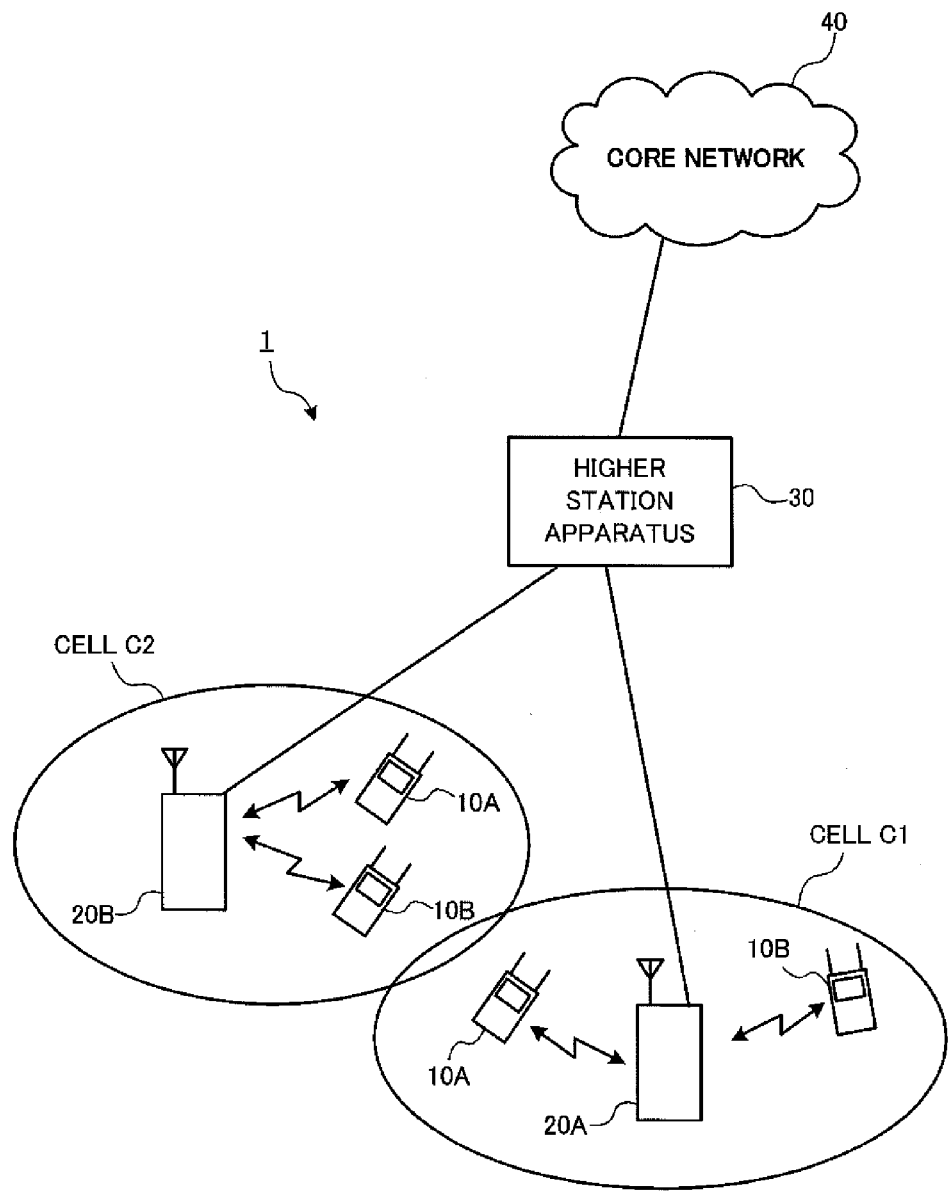
FIG. 8 is a diagram to explain a system configuration of a radio communication system.

Now, a radio communication system according to an embodiment of the present invention will be described below in detail. FIG. 8 is a diagram to explain a system configuration of a radio communication system according to the present embodiment. Note that the radio communication system shown in FIG. 8 is a system to accommodate, for example, an LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 8, a radio communication system 1 is configured to include radio base station apparatuses 20A and 20B, and a plurality of first and second user terminals 10A and 10B that communicate with these radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other by wire connection or by wireless connection. The first and second user terminals 10A and 10B are able to communicate with the radio base station apparatuses 20A and 20B in cells C1 and C2. Note that the higher station apparatus 30 may be, for example, an access gateway apparatus, a radio network controller (RNC), a mobility management entity (MME) and so on, but is by no means limited to these. Also, between cells, when necessary, CoMP transmission control is executed by a plurality of base stations.

Although the first and second user terminals 10A and 10B may be either LTE terminals or LTE-A terminals, the following description will be given simply with respect to the first and second user terminals, unless specified otherwise. Also, although the first and second user terminals 10A and 10B will be described to perform radio communication with the radio base station apparatuses 20A and 20B, for ease of explanation, more generally, user equipment (UE), including mobile terminal apparatuses and fixed terminal apparatuses, may be used as well.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH (Physical Downlink Shared Channel), which is a downlink data channel used by the first and second user terminals 10A and 10B on a shared basis, and downlink L1/L2 control channels (PDCCH, PCFICH, PHICH). Transmission data and higher control information are transmitted by the PDSCH. Scheduling information for the PDSCH and the PUSCH and so on is transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is an uplink data channel used by each user terminal on a shared basis, and a PUCCH (Physical Uplink Control Channel), which is an uplink control channel. By means of this PUSCH, transmission data and higher control information are transmitted. Furthermore, by the PUCCH, downlink received quality information (CQI), ACK/NACK, and so on are transmitted.

Now, an overall configuration of a radio base station apparatus according to the present embodiment will be described with reference to FIG. 9. Note that the radio base station apparatuses 20A and 20B are configured alike and therefore will be described simply as "radio base station apparatus 20" hereinafter. Also, the first and second user terminals 10A and 10B, which will be described later, are also configured alike and therefore will be described simply as "user terminal 10" hereinafter.

The radio base station apparatus 20 includes transmitting/receiving antennas 201, amplifying sections 202, transmitting/receiving sections (reporting sections) 203, a baseband signal processing section 204, a call processing section 205, and a transmission path interface 206. Transmission data to be transmitted from the radio base station apparatus 20 to the user terminal on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station apparatus 20, to the user terminals 10 connected to the same cell, via a broadcast channel. The information for allowing communication in the cell includes, for example, the uplink or downlink system bandwidth, root sequence identification information (root sequence index) for generating random access preamble signals in the PRACH (Physical Random Access Channel), and so on.

A baseband signal that is output from the baseband signal processing section 204 is converted into a radio frequency band in the transmitting/receiving sections 203. The amplifying sections 202 amplify the radio frequency signals having been subjected to frequency conversion, and output the results to the transmitting/receiving antennas 201. Note that the transmitting/receiving sections 203 constitute a receiving means to receive uplink signals including information about phase differences between a plurality of cells and PMIs, and a transmitting means to transmit transmission signals by coordinated multiple-point transmission. Also, the transmitting/receiving sections 203 also function as a reporting section by which the radio base station apparatus reports candidate inter-cell CSI values to the user terminal.

On the other hand, as for signals to be transmitted from the user terminal 10 to the radio base station apparatus 20 on the uplink, radio frequency signals that are received in the transmitting/receiving antennas 201 are amplified in the amplifying sections 202, converted into baseband signals through frequency conversion in the transmitting/receiving sections 203, and input in the baseband signal processing section 204.

The baseband signal processing section 204 applies an FFT process, an IDFT process, error correction decoding, a MAC retransmission control receiving process, and RLC layer and PDCP layer receiving processes, to the transmission data that is included in the baseband signal received on the uplink. The decoded signals are transferred to the higher station apparatus 30 through the transmission path interface 206.

The call processing section 205 performs call processing such as setting up and releasing communication channels, manages the state of the radio base station apparatus 20 and manages the radio resources.

Figure 9:
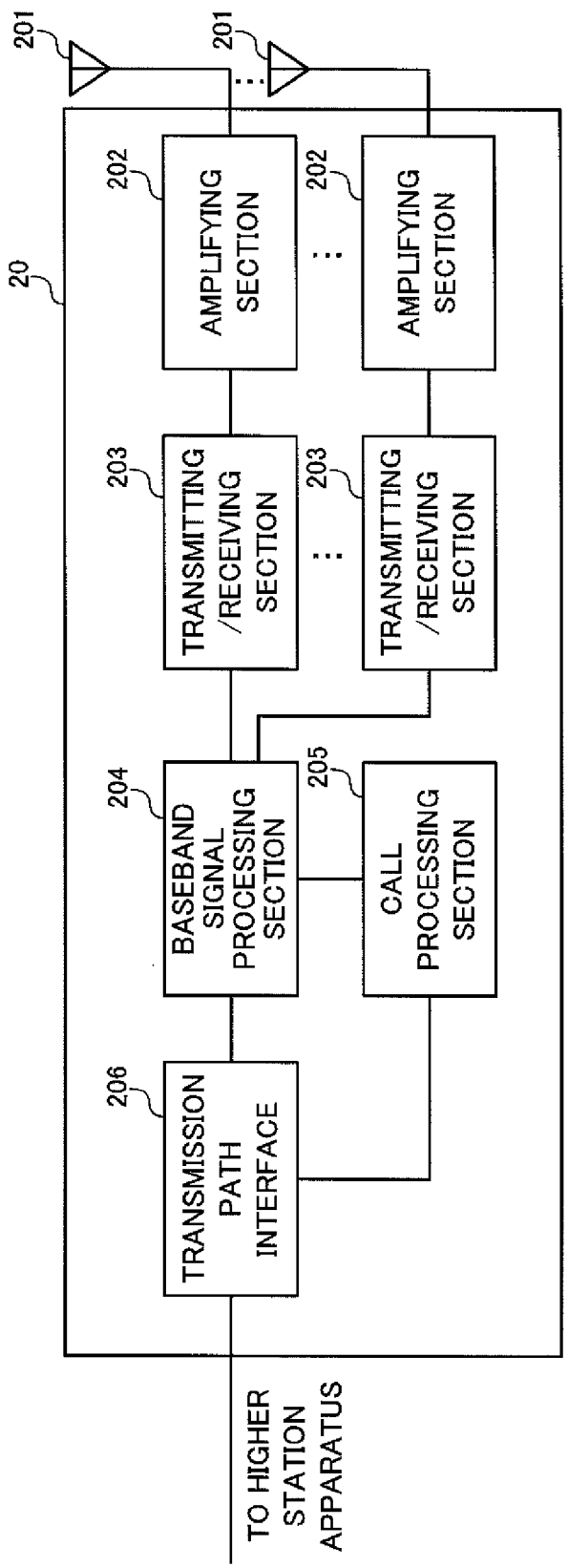
FIG. 9 is a diagram to explain an overall configuration of a radio base station apparatus.
Figure 10:
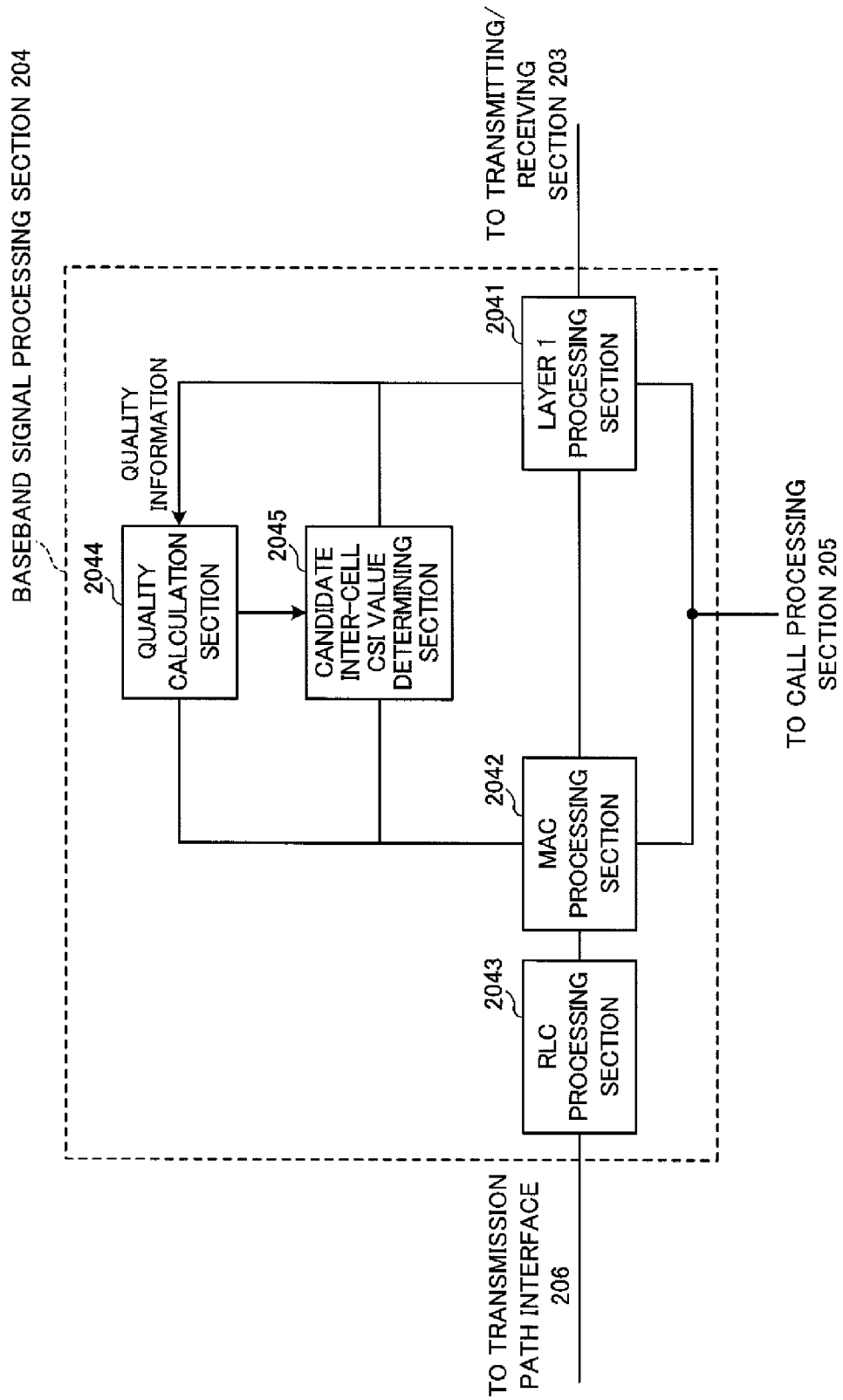
FIG. 10 is a functional block diagram corresponding to a baseband processing section of a radio base station apparatus.

FIG. 10 is a block diagram showing a configuration of a baseband signal processing section in the radio base station apparatus shown in FIG. 9. The baseband signal processing section 204 is primarily formed with a layer 1 processing section 2041, a MAC processing section 2042, an RLC processing section 2043, a quality calculation section 2044 and a candidate inter-cell CSI value determining section 2045.

The layer 1 processing section 2041 mainly performs processes related to the physical layer. The layer 1 processing section 2041 applies, for example, processes such as channel decoding, a discrete Fourier transform (DFT), frequency demapping, an inverse fast Fourier transform (IFFT), data demodulation and so on, to a signal received on the uplink. Also, the layer 1 processing section 2041 performs processes for a signal to transmit on the downlink, including channel coding, data modulation, frequency mapping and an inverse fast Fourier transform (IFFT).

The MAC processing section 2042 performs processes for MAC layer retransmission control for a signal that is received on the uplink, scheduling for the uplink/downlink, transport format selection for the PUSCH/PDSCH, and resource block selection for the PUSCH/PDSCH.

The RLC processing section 2043 performs, for a packet that is received on the uplink/a packet to transmit on the downlink, packet division, packet combining, RLC layer retransmission control and so on.

The quality calculation section 2044 calculates downlink received quality information (CQI) from the user terminal and so on, and outputs the result to the candidate inter-cell CSI value determining section 2045. Also, the quality calculation section 2044 is able to calculate quality differences between cells that carry out CoMP transmission, using the quality information (for example, RSRP) of each cell provided from the user terminal. The quality calculation section 2044 outputs information about the calculated quality differences between cells to the candidate inter-cell CSI value determining section 2045.

The candidate inter-cell CSI value determining section 2045 determines the candidate inter-cell CSI values to select anew, based on feedback information from the user terminal. To be more specific, the candidate inter-cell CSI value determining section 2045 changes the number and the designation range of candidate inter-cell CSI values dynamically based on predetermined conditions, as described above. For example, when inter-cell CSI varies little in the user terminal, as shown in FIG. 6 above, the candidate inter-cell CSI value determining section 2045 makes the number of candidate inter-cell CSI values to select smaller, and reduces the amount of information which the user terminal feeds back. Alternatively, when there are significant quality differences between the quality information of each cell carrying out CoMP transmission, the candidate inter-cell CSI value determining section 2045 makes the number of candidate inter-cell CSI values to select smaller and reduces the amount of information which the user terminal feeds back. The candidate inter-cell CSI values that are designated are reported to the user terminal through, for example, higher layer signaling.

Next, an overall configuration of a user terminal according to the present embodiment will be described with reference to FIG. 11. An LTE terminal and an LTE-A terminal have the same hardware configurations in principle parts, and therefore will be described indiscriminately. A user terminal 10 has transmitting/receiving antennas 101, amplifying sections 102, transmitting/receiving sections (receiving sections) 103, a baseband signal processing section 104, and an application section 105.

As for downlink data, radio frequency signals that are received in the transmitting/receiving antennas 101 are amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signals that are output from the baseband signal processing section 104 is converted into a radio frequency band in the transmitting/receiving sections 103. After that, the amplifying sections 102 amplify the radio frequency signal having been subjected to frequency conversion, and transmit the results from the transmitting/receiving antennas 101. Note that the transmitting/receiving sections 103 constitute a transmitting means to transmit information about phase differences, information about the connecting cells, selected PMIs and so on, to the radio base station apparatus eNBs of a plurality of cells, and a receiving means to receive downlink signals.

Figure 11:
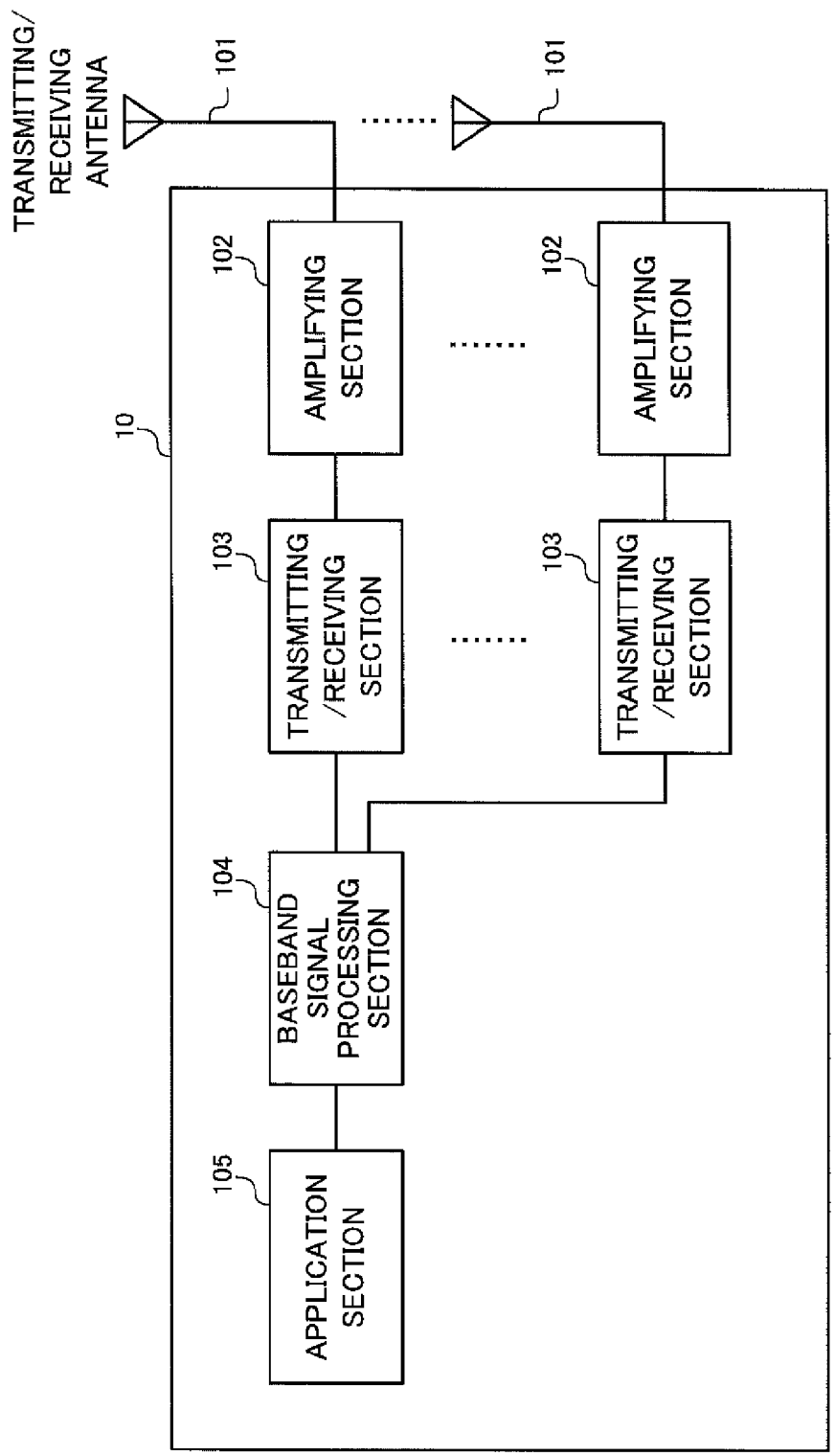
FIG. 11 is a diagram to explain an overall configuration of a user terminal.
Figure 12:
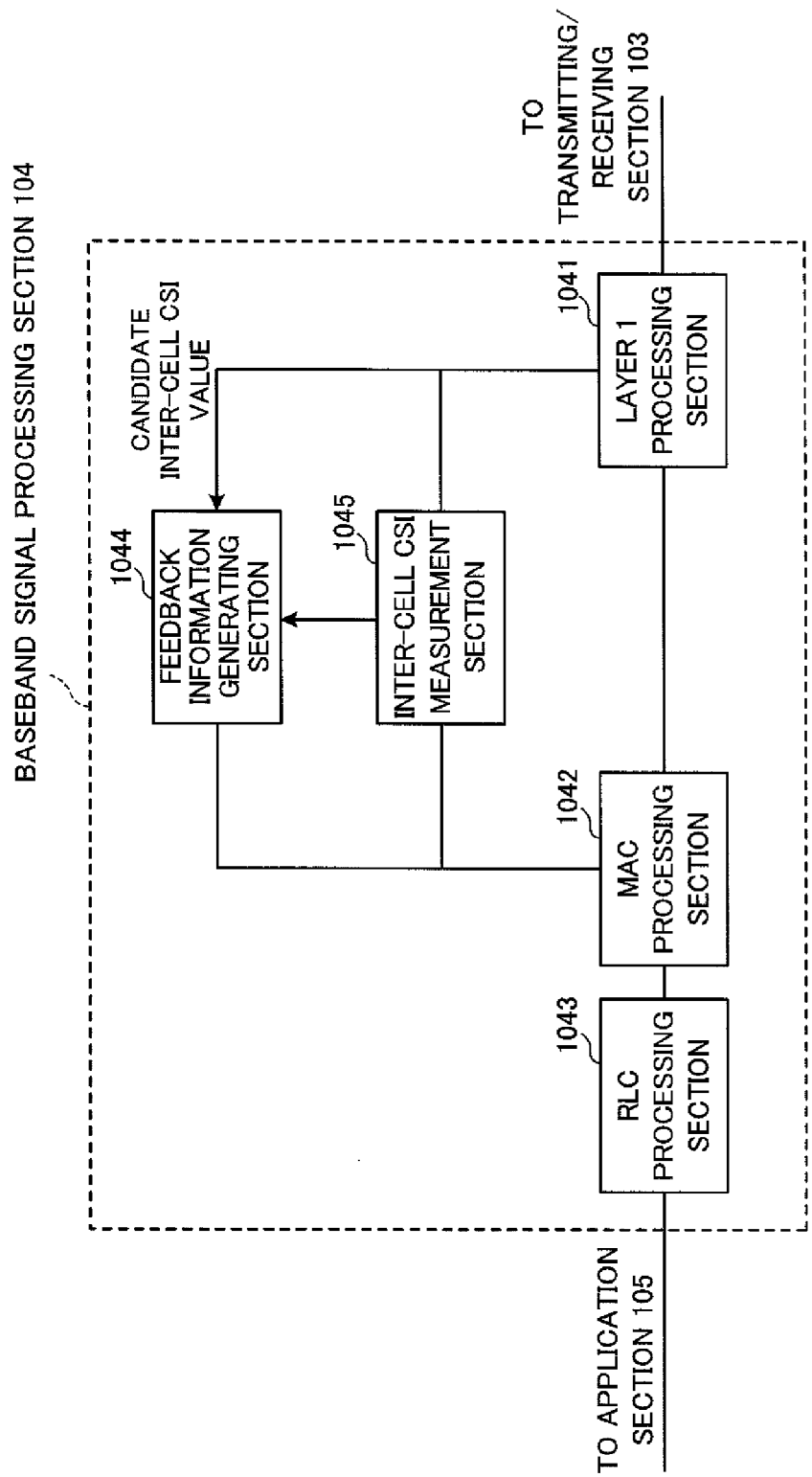
FIG. 12 is a functional block diagram corresponding to a baseband processing section of a user terminal.

FIG. 12 is a block diagram showing a configuration of a baseband signal processing section in the user terminal shown in FIG. 11. The baseband signal processing section 104 is primarily formed with a layer 1 processing section 1041, a MAC processing section 1042, an RLC processing section 1043, a feedback information generating section 1044, and an inter-cell CSI measurement section 1045.

The layer 1 processing section 1041 mainly performs processes related to the physical layer. The layer 1 processing section 1041 performs processes for a signal that is received on the downlink, such as channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse fast Fourier transform (IFFT), and so on.

The MAC processing section 1042 performs MAC layer retransmission control (HARQ) for a signal that is received on the downlink, an analysis of downlink scheduling information (specifying the PDSCH transport format, specifying the PDSCH resource blocks and so on), and so on. Also, the MAC processing section 1042 performs processes for MAC retransmission control for a signal to transmit on the uplink, an analysis of uplink scheduling information (specifying the PUSCH transport format, specifying the PUSCH resource blocks and so on), and so on.

The RLC processing section 1043 performs, for a packet received on the downlink/a packet to transmit on the uplink, packet division, packet combining, RLC layer retransmission control and so on.

The inter-cell CSI measurement section 1045 measures the inter-cell CSI (phase difference information, amplitude difference information) of each cell carrying out CoMP transmission. The measured inter-cell CSI measurement values are output to the feedback information generating section 1044.

The feedback information generating section 1044 generates CSI (feedback information). As CSI, there are cell-specific CSI (PMI, CDI, CQI, etc.), inter-cell CSI (phase difference information, amplitude difference information, etc.), RI (Rank Indicator) and so on. The feedback information generating section 1044 functions as a detection section to select a candidate value that is close to the inter-cell CSI measurement value from the candidate inter-cell CSI values reported from the radio base station apparatus, especially with respect to inter-cell CSI. These CSIs are fed back to the radio base station apparatus through the PUCCH and the PUSCH.

In the radio communication system configured as noted above, first, the candidate inter-cell CSI value determining section 2045 of the radio base station apparatus designates the bits to represent the candidate inter-cell CSI values to report to a user terminal. The candidate inter-cell CSI value determining section 2045 can determine the candidate inter-cell CSI values to select anew, taking into account the distribution of candidate inter-cell CSI values fed back from the user terminal and so on. Also, at this time, it is equally possible to determine the candidate inter-cell CSI values, taking into account the quality differences between cells that carry out CoMP transmission and downlink received quality information (CQI) output from the quality calculation section 2044. The radio base station apparatus designates and reports the bits to represent the candidate inter-cell CSI values to the user terminal through higher layer signaling.

Next, in the inter-cell CSI measurement section 1045 of the mobile terminal apparatus, inter-cell CSI is measured and output to the feedback information generating section 1044. The feedback information generating section 1044 selects a specific candidate value that is close to the inter-cell CSI measurement value from among the candidate inter-cell CSI values reported from the radio base station apparatus. Then, the inter-cell CSI of each cell generated in this way is fed back to the radio base station apparatuses of the cells carrying out CoMP transmission, with other CSIs, on a per cell basis. By this means, under various conditions, it is possible to maintain the accuracy of inter-cell CSI to be fed back from the user terminal, and make possible reduced overhead of feedback information.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-021078, filed on Feb. 2, 2012, including the specification, drawings and abstract, is incorporated herein by reference in its entirety.

The invention claimed is:

1. A radio communication system comprising a plurality of radio base station apparatuses and a user terminal that is configured to be able to perform coordinated multiple-point transmission/reception with the plurality of radio base station apparatuses, wherein:
the radio base station apparatus comprises:
a determining section configured to designate a plurality of candidate values for predetermined inter-cell channel state information; and
a reporting section configured to report the plurality of candidate values to the user terminal; and
the user terminal comprises:
a measurement section configured to measure inter-cell channel state information per cell;
a detection section configured to select a specific candidate value that is close to a measurement value of inter-cell channel state information from the plurality of candidate values reported; and
a transmission section configured to feed back information to represent the specific candidate value.

2. The radio communication system according to claim 1, wherein the determining section designates a bit to represent a predetermined candidate value to report to the user terminal, from among bit fields that respectively correspond to candidate values which the radio base station apparatus can select.

3. The radio communication system according to claim 2, wherein the reporting section reports bit information to represent the predetermined candidate value through higher layer signaling.

4. The radio communication system according to claim 1, wherein the determining section designates a plurality of candidate values that correspond to a predetermined range where the specific candidate value is included, in a localized manner, based on the specific candidate value fed back from the user terminal.

5. The radio communication system according to claim 4, wherein the determining section makes the number of candidate values to designate anew the same or smaller, based on the specific candidate value fed back from the user terminal.

6. The radio communication system according to claim 1, wherein the determining section dynamically changes the number of candidate values to designate, based on channel quality information and/or a quality difference between cells that carry out coordinated multiple-point transmission.

7. The radio communication system according to claim 1, wherein the determining section dynamically changes the number of candidate values to designate, based on a physical channel to be applied when the transmission section of the user terminal feeds back the channel state information.

8. The radio communication system according to claim 1, wherein the inter-cell channel state information is phase difference information and/or amplitude difference information between cells.

9. A user terminal that is configured to be able to carry out coordinated multiple-point transmission/reception with a plurality of radio base station apparatuses, the user terminal comprising:
a receiving section configured to receive a plurality of candidate values for inter-cell channel state information which the radio base station apparatus designates;
a measurement section configured to measure inter-cell channel state information per cell;
a detection section configured to select a specific candidate value that is close to a measurement value of inter-cell channel state information from the plurality of candidate values; and
a transmission section configured to feed back information to represent the specific candidate value.

10. A radio base station apparatus that is configured to be able to carry out coordinated multiple-point transmission/reception with a user terminal, the radio base station apparatus comprising:
a determining section configured to designate a plurality of candidate values for predetermined inter-cell channel state information which the user terminal is allowed to select; and a reporting section configured to report the plurality of candidate values to the user terminal, wherein the determining section designates a bit to represent a predetermined candidate value to report to the user terminal, from among bit fields that respectively correspond to candidate values that can be selected.

11. A radio communication method for a plurality of radio base station apparatuses and a user terminal that is configured to be able to perform coordinated multiple-point transmission/reception with the plurality of radio base station apparatuses, the radio communication method comprising the steps of:

at the radio base station apparatus:
designating a plurality of candidate values for predetermined inter-cell channel state information; and
reporting the plurality of candidate values to the user terminal; and at the user terminal:
measuring inter-cell channel state information per cell;
selecting a specific candidate value that is close to a measurement value of inter-cell channel state information from the plurality of candidate values reported from the radio base station apparatus; and
feeding back information to represent the specific candidate value.

* * * * *